US006933818B2

(12) United States Patent
Kaneshige

(10) Patent No.: US 6,933,818 B2
(45) Date of Patent: Aug. 23, 2005

(54) TORQUE MOTORS

(75) Inventor: Susumu Kaneshige, Aichi-ken (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 53 days.

(21) Appl. No.: 10/874,183

(22) Filed: Jun. 24, 2004

(65) Prior Publication Data

US 2005/0012580 A1 Jan. 20, 2005

(30) Foreign Application Priority Data

Jun. 27, 2003 (JP) ....................................... 2003-184623

(51) Int. Cl.[7] ................................................ H02K 33/02

(52) U.S. Cl. .................... 335/272; 310/36; 310/156.01; 310/156.44; 310/179; 310/181; 310/192; 310/193

(58) Field of Search .............................. 310/36, 156.01, 310/156.43–156.47, 179, 181, 192, 193; 335/272

(56) References Cited

U.S. PATENT DOCUMENTS 4,992,685 A * 2/1991 Boon et al. .................... 310/37
5,682,129 A * 10/1997 Christiaens ................. 335/272
6,005,319 A * 12/1999 Kondo .................. 310/156.45

FOREIGN PATENT DOCUMENTS

JP 01-092541 4/1989

* cited by examiner

*Primary Examiner*—Ramon M. Barrera
(74) *Attorney, Agent, or Firm*—Dennison, Schultz, Dougherty & MacDonald

(57) ABSTRACT

A torque motor may include a rotor having at least two magnets disposed thereon, and a stator having a core and at least one coil. The magnets are arranged and constructed so that the outer surfaces thereof alternately have a N pole and a S pole. The magnets cover the rotor over an angle of less than 360 degrees. The core has a first and second magnetic pole elements. The magnetic pole elements are arranged and constructed such that an angle defined between a first straight line passing through a center of the first magnetic element and a center of rotation of the rotor and a second straight line passing through a center of the second magnetic element and the center of rotation of the rotor is less than 180 degrees.

8 Claims, 10 Drawing Sheets

TORQUE MOTORS

BACKGROUND OF THE INVENTION

1. Field of the Invention

The present invention relates to torque motors having an operating angular range less than 180 degrees (e.g., 90 degrees).

2. Description of the Related Art

Conventionally, for example, a throttle valve may preferably be operated by a torque motor having an operating angular range of less than 180 degrees.

As shown in FIGS. 9 and 10(A), such a known torque motor 101 includes a rotor 110 and a stator 120. The rotor 110 has a center of rotation P110 and comprises a pair of semicircular magnets 112 and 112'. The magnets 112 and 112' are arranged and constructed so that the outer surfaces thereof respectively have a N pole and a S pole. Thus, the rotor 110 is circumferentially provided with the magnets 112 and 112' over an angle of 360 degrees. That is, a magnet covering angle of the rotor 110 is 360 degrees, because each magnet may cover the rotor 110 over an angle of 180 degrees. The stator 120 comprises a core 123 and a coil 130. The core 123 has a pair of opposed magnetic pole elements 121 and 122 that respectively have a center P121 and P122. The magnetic pole elements 121 and 122 are arranged and constructed such that a straight line L121 passing through the center P121 and the center of rotation P110 is aligned with a straight line L122 passing through the center P122 and the center of rotation P110 (i.e., such that an angle defined between the straight lines L121 and L122 is 180 degrees).

As shown in FIG. 10(B), the above-described known torque motor 101 thus constructed may have an effective torque generating range of 180 degrees, because the magnets 112 and 112' are arranged over an angle of 360 degrees. Therefore, the rotor 110 may typically have an effective operational angular range of about 180 degrees. That is, the rotor 110 can rotate clockwise by 90 degrees as well as counterclockwise by 90 degrees from the position shown in FIG. 10(A).

However, as shown in FIG. 9, when the torque motor 101 is used for driving a throttle valve 80, a required or actual operational angular range of the rotor 110 is 90 degrees (i.e., much less than 180 degrees), because the throttle valve 80 may preferably be controlled only through an angular range of 90 degrees. As a result, in the known torque motor 101, as shown in FIG. 10(B), only a portion (i.e., about one-half) of the effective torque generating range is actually utilized in order to operate the rotor 110. In other words, the effective torque generating range of the torque motor 101 may have a "use range" that corresponds to the actual operational angular range of the rotor 110 and a "nonuse range" that does not correspond to the actual operational angular range of the rotor 110.

Thus, the known torque motor has an excessive or unnecessary torque generating range considering that the actual operational angular range of the rotor 110 is only 90 degrees. That is, in the known torque motor 101, the rotor 110 and the stator 120 are not suitably or appropriately designed in compliance with the required or actual operational angular range of the rotor 110. Such a design of the rotor 110 and the stator 120 may interfere with downsizing and weight saving of the torque motor 101.

Another known torque motor is taught, for example, by Japanese Laid-Open Patent Publication No. 1-92541.

SUMMARY OF THE INVENTION

It is, accordingly, one object of the present teachings to provide improved torque motors.

In one embodiment of the present teachings, a torque motor may include a rotor having at least two magnets disposed thereon, and a stator having a core and at least one coil. The magnets are arranged and constructed so that the outer surfaces thereof alternately have a N pole and a S pole. The magnets cover the rotor over an angle of less than 360 degrees. The core has first and second magnetic pole elements facing the rotor and a connecting element interconnecting the first and second magnetic pole elements. The at least one coil is disposed on the connecting element of the core. The magnetic pole elements are arranged and constructed such that an angle defined between a first straight line passing through a center of the first magnetic element and a center of rotation of the rotor and a second straight line passing through a center of the second magnetic element and the center of rotation of the rotor is less than 180 degrees, so that the rotor has an effective operating angular range of less than 180 degrees.

According to the present torque motor, the rotor and the stator may preferably be designed such that the torque motor does not have an excessive or unnecessary torque generating range. As a result, the torque motor can be downsized and weight saved (weight reduced).

Other objects, features and advantage of the present invention will be readily understood after reading the following detailed description together with the accompanying drawings and the claims.

DETAILED DESCRIPTION OF THE INVENTION

Figure 1:
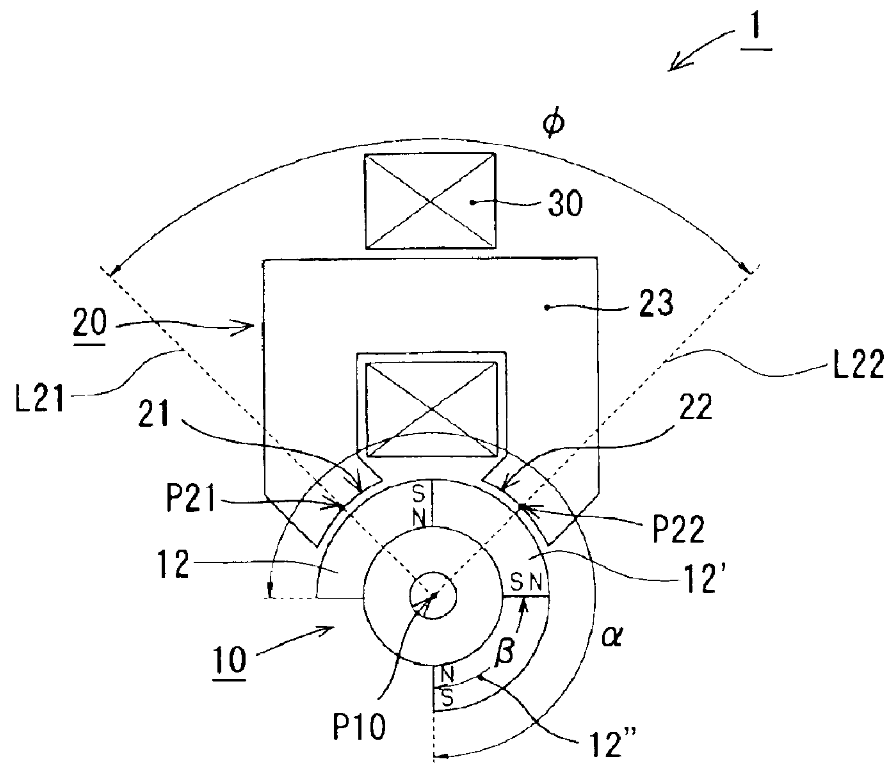
FIG. 1(A) is a schematic view illustrating a torque motor according to a first embodiment of the present teachings.
FIG. 1(B) is a graph illustrating torque versus rotor rotating angle relationship in the present torque motor and a conventional torque motor.
Figure 1:
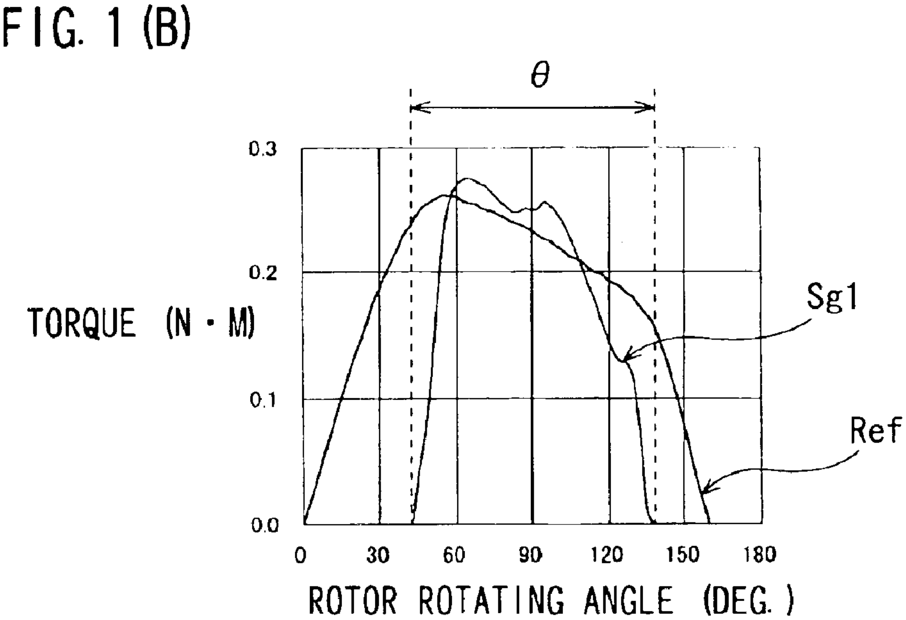

Eight detailed representative embodiments of the present teachings will now be described in further detail with reference to FIGS. 1 to 8(C).

First Detailed Representative Embodiment

The first detailed representative embodiment will now be described with reference to FIGS. 1(A) and 1(B).

As shown in FIG. 1(A), a torque motor 1 includes a rotor 10 and a stator 20. The rotor 10 has a center of rotation P10 and comprises three quadrant magnets 12, 12' and 12" that are closely disposed therearound in this order. The magnets 12, 12' and 12" are arranged and constructed so that the outer arcuate surfaces thereof alternately have a N pole and a S pole. In addition, each of the magnets 12, 12' and 12" respectively has a magnet angle β of 90 degrees. Thus, the rotor 10 is circumferentially provided with magnets 12, 12' and 12" over an angle of 270 degrees (i.e., less than 360 degrees). That is, a total magnet angle α of the magnets 12, 12' and 12" is 270 degrees, because each of the magnets 12, 12' and 12" respectively has a magnet angle β of 90 degrees.

The stator 20 comprises a core 23 and a coil 30. The core 23 has a pair of angularly opposed magnetic pole elements 21 and 22 facing the rotor 10 and a U-shaped non-magnetic pole element (i.e., a connecting element) interconnecting the elements 21 and 22. The magnetic pole elements 21 and 22 respectively have centers P21 and P22. The magnetic pole elements 21 and 22 are arranged and constructed such that an angle ϕ defined between a straight line L21, passing through the center P21 and the center of rotation P10, and a straight line L22, passing through the center P22 and the center of rotation P10, is about 90 degrees. The coil 30 is laterally directed and is disposed around the connecting element between the magnetic pole elements 21 and 22.

Therefore, the above-described torque motor 1 thus constructed may have an effective torque generating range of 90 degrees that corresponds to the angle ϕ. As a result, as shown by a graph (i.e., a torque-rotor rotating angle curve) of Sg1 in FIG. 1(B), the rotor 10 may typically have an effective operational angular range θ of about 90 degrees. That is, the rotor 10 can rotate counterclockwise only by 90 degrees from a starting position.

Therefore, when the torque motor 1 is used for driving a throttle valve (not shown), the required or actual operational angular range of the rotor 10 is 90 degrees, because the throttle valve may generally be controlled only through an angular range of 90 degrees. Therefore, according to the present torque motor 1, all of the substantial portions of the effective operational angular range θ can be utilized. In other words, the effective torque generating range of the torque motor 1 may have only a "use range" and not a "nonuse range."

Further, as shown in FIG. 1(B), in comparison with a graph (i.e., a torque-rotor rotating angle curve) of Ref corresponding to a conventional torque motor (not shown), the present torque motor 1 may produce a peak torque greater than that of the conventional torque motor. In addition, the present torque motor 1 may produce a desired torque in a substantial portion of the effective operational angular range θ, which portion corresponds to a rotor rotating angle range of about 60 to 110 degrees in a conventional torque motor.

According to the torque motor 1 of the present embodiment, the rotor 10 and the stator 20 can be downsized and weight saved. As a result, the weight of the torque motor 1 can be reduce to about two third (⅔) of the weight of a conventional torque motor.

Second Detailed Representative Embodiment

The second detailed representative embodiment will now be described with reference to FIGS. 2(A) and 2(B).

Because the second embodiment relates to the first embodiment, only the constructions and elements that are different from the first embodiment will be explained in detail. Elements that are the same as in the first embodiment will be identified by the same reference numerals and a detailed description of such elements may be omitted.

Figure 2A:
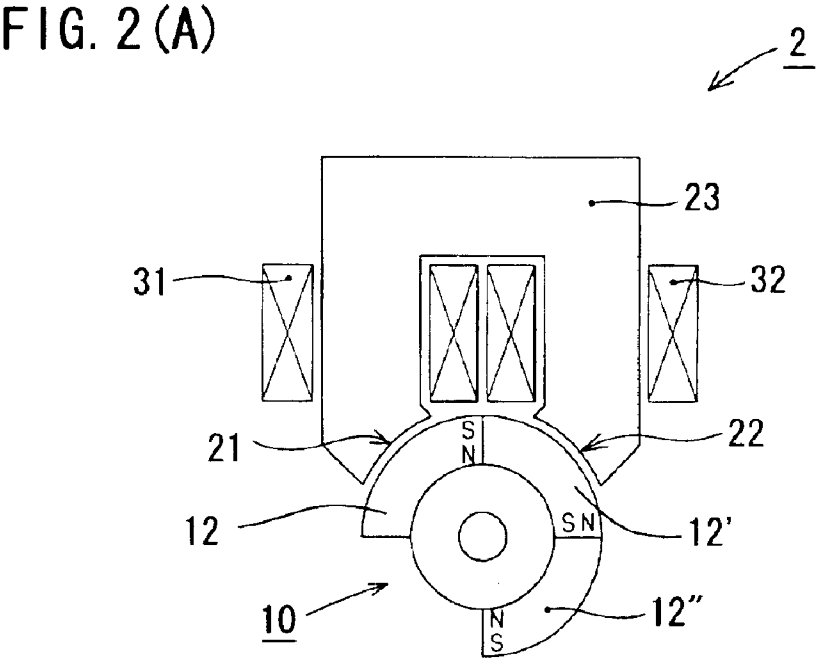
FIG. 2(A) is a schematic view illustrating a torque motor according to a second embodiment of the present teachings.

As shown in FIG. 2(A), in a torque motor 2 of this embodiment, the stator 20 comprises a pair of coils 31 and 32. Unlike the first embodiment, the coils 31 and 32 are vertically directed in parallel and are respectively disposed adjacent to the magnetic pole elements 21 and 22 of the core 23. It is expected that the torque motor 2 having the coils 31 and 32 may generate a torque greater than the torque motor 1 having the single coil 30 as in the first embodiment.

As will be appreciated, the coils 31 and 32 can be preferably connected in series or in parallel. When the coils 31 and 32 are connected in parallel, if the winding number of the coils 31 and 32 is equal to that of the single coil 30, a diameter of wires of the coils 31 and 32 can be reduced to 1/square root of 2 ($1/\sqrt{2}$) of the single coil in order to make the "coil resistance" of the coils 31 and 32 equal to that of the single coil 30.

Figure 2B:
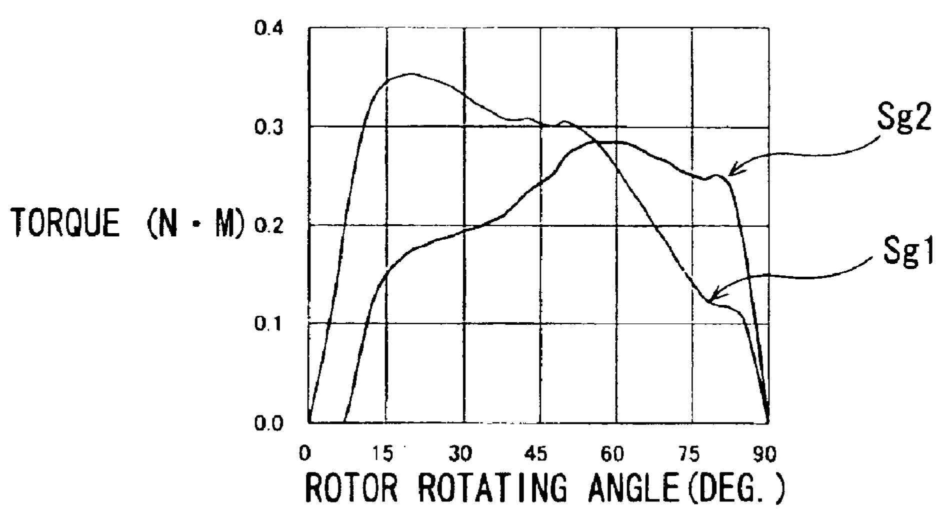
FIG. 2(B) is a graph illustrating torque versus rotor rotating angle relationship in the torque motor.

As shown in FIG. 2(B), according to the torque motor 2 of this embodiment, a graph (i.e., a torque-rotor rotating angle curve) of Sg2 is obtained. From comparing the graph Sg2 with the graph Sg1 corresponding to the first embodiment, at a higher rotor rotating angle range of the rotor 10 (i.e., about 65 to 90 degrees), the present torque motor 2 may have a torque greater than that of the torque motor 1 of the first embodiment. The torque of the torque motor 2 at such a higher rotor rotating angle range may preferably be increased by about 25% over the torque motor 1 of the first embodiment.

As described above, the torque motor 2 of the present embodiment may have an increased torque at a higher rotor rotating angle. Therefore, if such a high torque is not required (i.e., if the torque level of the first embodiment is sufficient), the coils 31 and 32 can be downsized. As a result, the torque motor 2 can be downsized and weight saved.

Third Detailed Representative Embodiment

The third detailed representative embodiment will now be described with reference to FIGS. 3(A) to 3(C).

Because the third embodiment relates to the first embodiment, only the constructions and elements that are different from the first embodiment will be explained in detail. Elements that are the same as in the first embodiment will be identified by the same reference numerals and a detailed description of such elements may be omitted.

Figure 3A:
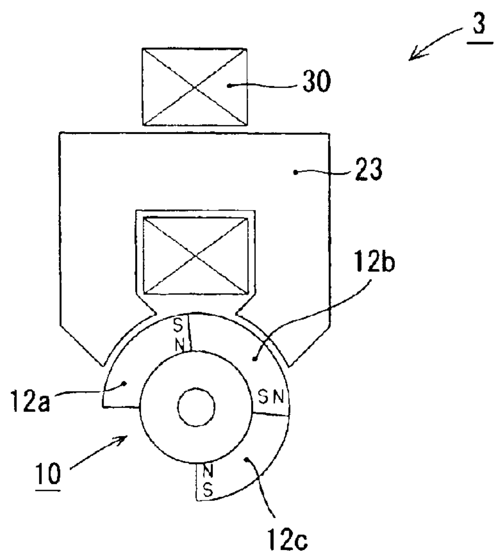
FIG. 3(A) is a schematic view illustrating a torque motor according to a third embodiment of the present teachings.
Figure 3B:
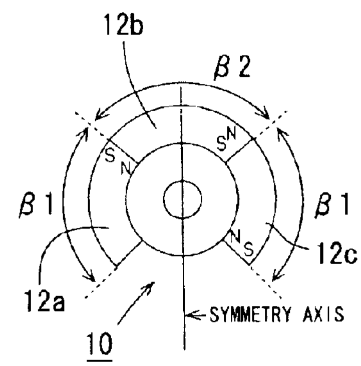
FIG. 3(B) is an explanatory view illustrating a rotor of the torque motor.

As shown in FIGS. 3(A) and 3(B), in a torque motor 3 of this embodiment, magnets 12*a*, 12*b* and 12*c* are substituted for the magnets 12, 12' and 12". Similar to the first embodiment, the magnets 12*a*, 12*b* and 12*c* are arranged and constructed so that the outer arcuate surfaces of thereof alternately have a N pole and a S pole. However, the magnets 12*a*, 12*b* and 12*c* do not have the same consistent magnet angles as the magnets 12, 12' and 12". As shown in FIG. 3(B), each of the magnets 12*a* and 12*c*, configured with the same polarity, has a magnet angle β1 (i.e., a first magnet angle) and the magnet 12*b*, configured with a different polarity, has a magnet angle β2 (i.e., a second magnet angle). Magnet angle β2 is different from the magnet angle β1. That is, in this embodiment, only the magnets 12*a* and 12*c* have the same magnet angle. (The magnets 12*a* to 12*c* may preferably be symmetrically arranged around a symmetry axis.) Further, similar to the first embodiment, the total magnet angle (i.e., 2×β1+β2) of the magnets 12*a*, 12*b* and 12*c* is 270 degrees.

Figure 3C:
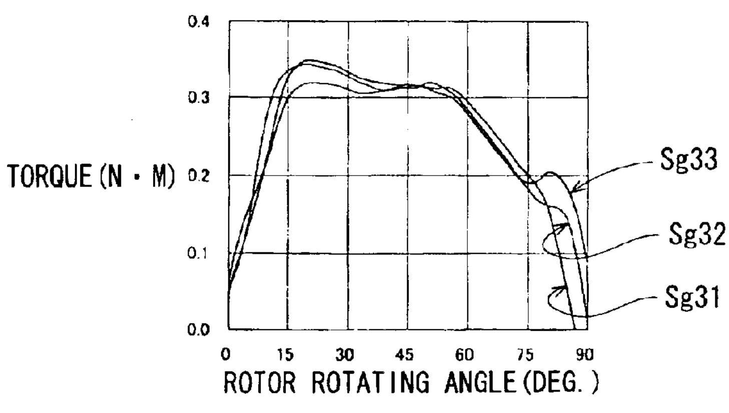
FIG. 3(C) is a graph illustrating torque versus rotor rotating angle relationship in the torque motor.

As shown in FIG. 3(C), when the first and second magnet angles β1 and β2 are respectively 95 and 80 degrees, a graph (i.e., a torque-rotor rotating angle curve) of Sg31 is obtained. Similarly, when the first and second magnet angles β1 and β2 are respectively 90 and 90 degrees, a graph of Sg32 is obtained. Further, when the first and second magnet angles β1 and β2 are respectively 85 and 100 degrees, a graph of Sg33 is obtained.

Thus, according to this embodiment, the torque generating characteristics of the torque motor 3 may preferably be changed by varying the first and second magnet angles β1 and β2. That is, such torque generating characteristics of the torque motor 3 can be easily changed by simply changing the first and second magnet angles β1 and β2 without changing the coil 30 or the core 23.

This may contribute to downsizing and weight saving of the torque motor 3.

Fourth Detailed Representative Embodiment

The fourth detailed representative embodiment will now be described with reference to FIGS. 4(A) to 4(C).

Because the fourth embodiment relates to the first and third embodiments, only the constructions and elements that are different from the first and third embodiments will be explained in detail. Elements that are the same as in the first and third embodiments will be identified by the same reference numerals and a detailed description of such elements may be omitted.

Figure 4A:
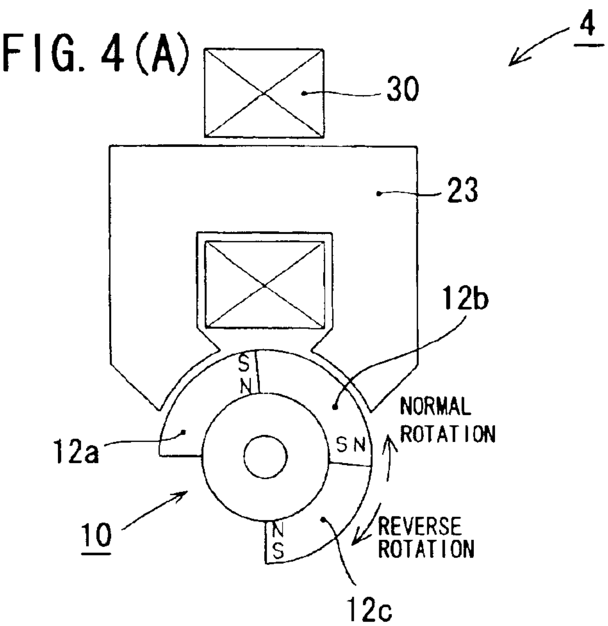
FIG. 4(A) is a schematic view illustrating a torque motor according to a fourth embodiment of the present teachings.
Figure 4B:
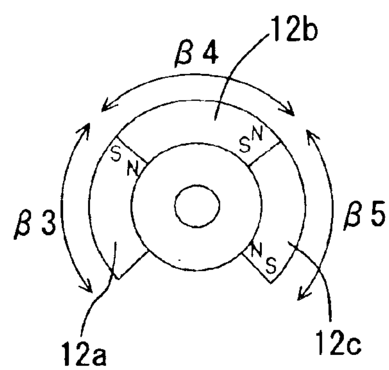
FIG.4(B) is an explanatory view illustrating a rotor of the torque motor.

As shown in FIGS. 4(A) and 4(B), in a torque motor 4 of this embodiment, unlike the third embodiment, the magnets 12*a*, 12*b* and 12*c* respectively have a magnet angle β3 (i.e., a third magnet angle), a magnet angle β4 (i.e., a fourth magnet angle) and a magnet angle β5 (i.e., a fifth magnet angle). In this embodiment, the magnets 12*a* and 12*c* may have different magnet angles. Further, unlike the third embodiment, the total magnet angle (i.e., β3+β4+β5) of the magnets 12*a*, 12*b* and 12*c* is not fixed to 270 degrees.

As will be recognized, the torque motor 4 may have different torque generating characteristics in a normal rotational direction (counterclockwise) and a reverse rotational direction (clockwise), because all of the magnets 12*a* through 12*c* have different magnet angles. (To the contrary, the torque motor 3 of the third embodiment may have the same torque generating characteristics in a normal rotational direction and a reverse rotational direction, because the magnets 12*a* and 12*c* have the same magnet angle.)

When the torque motor 4 is used for driving the throttle valve, the required torque in the normal rotational direction is generally different from the required torque in the reverse rotational direction. Typically, the throttle valve may require a large initial torque when opened (i.e., when rotated in the normal rotational direction), because the throttle valve is affected by the pressures of aspirated air when opened. Also, the throttle valve may generally be arranged and constructed to be automatically returned or closed by a biasing member such as a spring. Therefore, the required torque in the reverse rotational direction may be smaller than the required torque in the normal rotational direction. The throttle valve does not substantially require additional torque when closed (i.e., when rotated in the reverse rotational direction). Thus, it is useful that a torque motor for the throttle valve may preferably be designed so as to have different torque generating characteristics in the normal rotational direction and the reverse rotational direction.

Figure 4C:
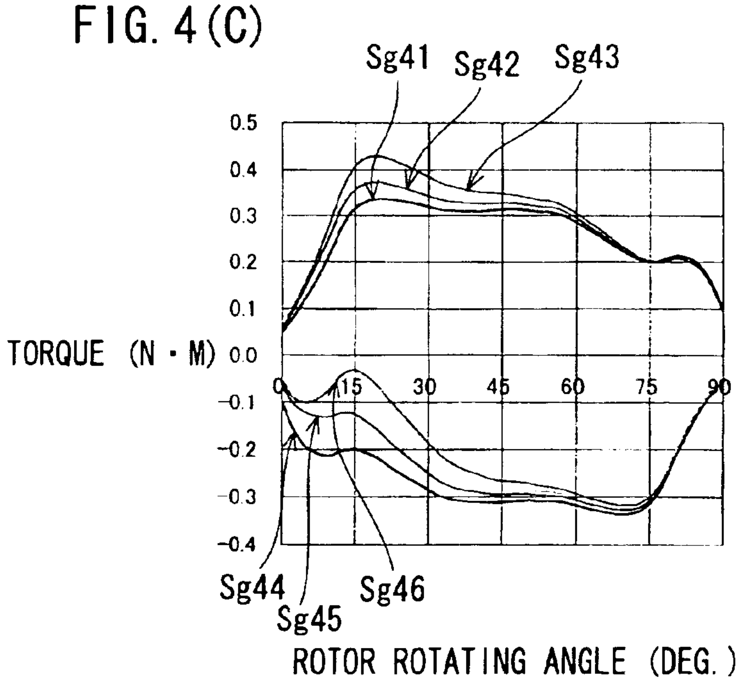
FIG. 4(C) is a graph illustrating torque versus rotor rotating angle relationship in the torque motor for normal and reverse rotation.

As shown in FIG. 4(C), when the third to fifth magnet angles β3, β4 and β5 are respectively 85, 100 and 85 degrees, a graph of Sg41 and a graph of Sg44 are obtained. The graphs Sg41 and Sg44 respectively correspond to the torque-rotor rotating angle curves in the normal and reverse rotational directions. Also, when the third to fifth magnet angles β3, β4 and β5 are respectively 75, 100 and 85 degrees, a graph of Sg42 and a graph of Sg45 are obtained. The graphs Sg42 and Sg45 respectively correspond to the torque-rotor rotating angle curves in the normal and reverse rotational directions. Further, when the third to fifth magnet angles β3, β4 and β5 are respectively 65, 100 and 85 degrees, a graph of Sg43 and a graph of Sg46 are obtained. Similarly, the graphs Sg43 and Sg46 respectively correspond to the torque-rotor rotating angle curves in the normal and reverse rotational directions. Further, the graph of Sg41 is symmetrical (point symmetrical) with the graph of Sg44, because the magnets 12*a* and 12*c* have the same magnet angle of 85 degrees.

As will be apparent from FIG. 4(C), when the third magnet angle β3 is reduced without changing the fourth and fifth magnet angles β4 and β5, the torque motor 4 may generate an increased torque in the normal rotational direction as well as a reduced torque in the reverse rotational direction. That is, the torque generating characteristics of the torque motor 4 in the normal and reverse rotational directions may preferably be changed by simply varying the third magnet angle β3. Therefore, if the required torque in the reverse rotational direction is smaller than the required torque in the normal rotational direction or if the required torque in the reverse rotational direction is substantially zero, the smaller required torque in the reverse rotational direction can be obtained by reducing the third magnet angle β3.

Further, the magnet 12*a* is downsized by reducing the third magnet angle β3. As a result, reduction of the third magnet angle β3 may lead to downsizing and weight saving of the torque motor 4.

Fifth Detailed Representative Embodiment

The fifth detailed representative embodiment will now be described with reference to FIGS. 5(A) and 5(B).

Because the fifth embodiment relates to the first embodiment, only the constructions and elements that are different from the first embodiment will be explained in detail. Elements that are the same as in the first embodiment will be identified by the same reference numerals and a detailed description of such elements may be omitted.

Figure 5A:
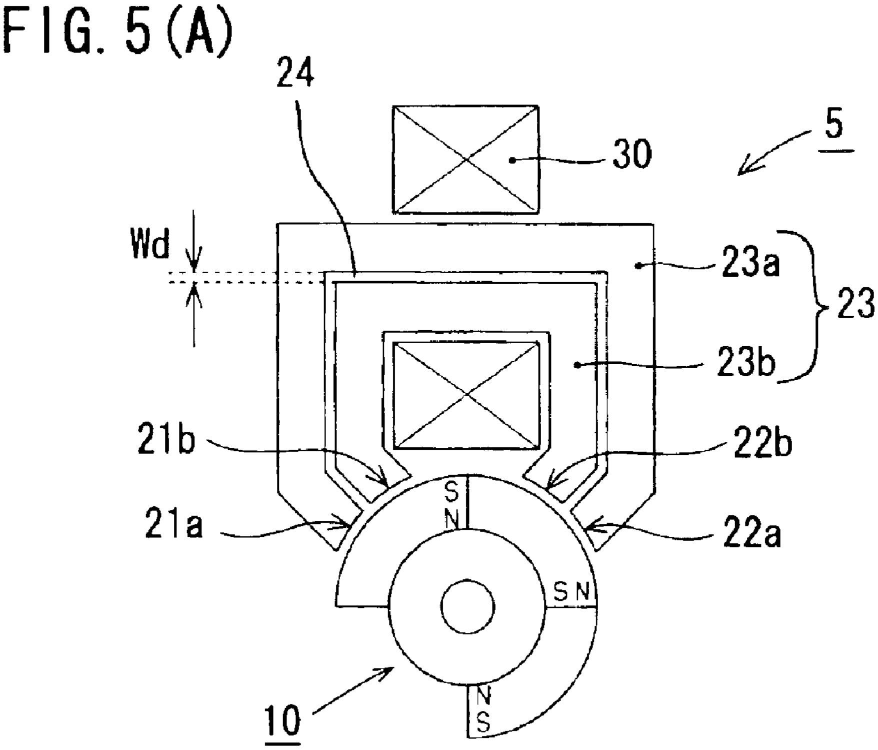
FIG. 5(A) is a schematic view illustrating a torque motor according to a fifth embodiment of the present teachings.
Figure 5B:
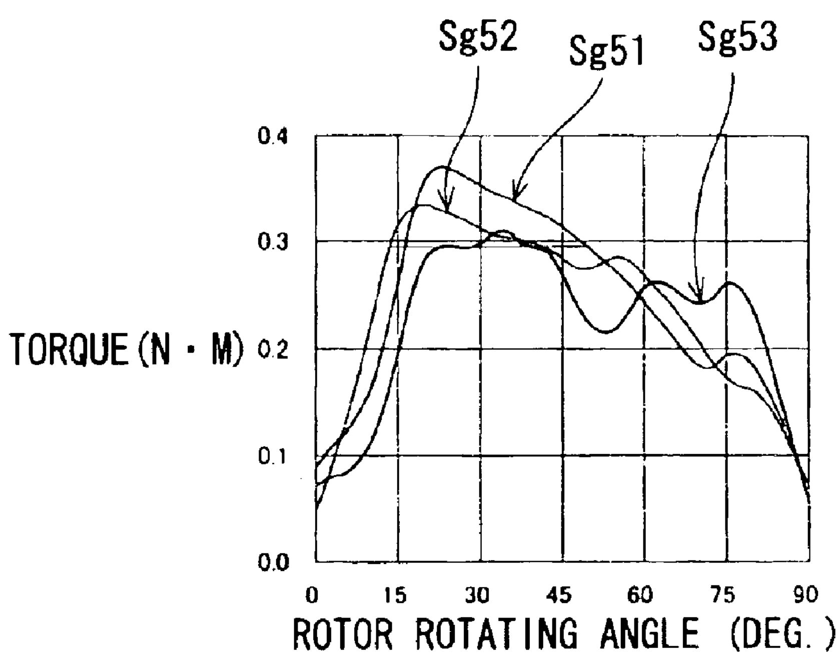
FIG. 5(B) is a graph illustrating torque versus rotor rotating angle relationship in the torque motor.

As shown in FIG. 5(A), in a torque motor 5 of this embodiment, the core 23 is formed with a slot 24 having a desired width Wd. The slot 24 extends along the entire length of the core 23 such that the core 23 can be divided to a first core portion 23*a* and a second core portion 23*b*. The first core portion 23*a* has a pair of magnetic pole elements 21*a* and 22*a*. The second core portion 23*b* has a pair of magnetic pole elements 21*b* and 22*b*. Further, the core 23 may preferably be equally divided such that the magnetic pole element 21*a* may have the same area as the magnetic pole element 21*b*.

The torque motor 5 of this embodiment may have different torque generating characteristics when the width Wd of the slot 24 is changed. As shown in FIG. 5(B), various types of graphs (i.e., torque-rotor rotating angle curves) Sg51, Sg52 and Sg53 are obtained when the width Wd is changed. The graphs of Sg51, Sg52 and Sg53 respectively correspond to the width Wd of 0 mm, 1 mm and 2 mm.

As will be recognized, when the width Wd of the slot 24 is increased, the torque motor 5 may generate a reduced torque. Thus, the torque generating characteristics of the torque motor 5 may preferably be changed and controlled by simply varying the width Wd of the slot 24 without modifying the coil 30.

The core 23 is weight saved by increasing the width Wd of the slot 24. As a result, increasing of the width Wd of the slot 24 may lead to an overall weight saving of the torque motor 5.

Sixth Detailed Representative Embodiment

The sixth detailed representative embodiment will now be described with reference to FIGS. 6(A) to 6(C).

Because the sixth embodiment relates to the fifth embodiment, only the constructions and elements that are different from the fifth embodiment will be explained in detail. Elements that are the same as in the fifth embodiment will be identified by the same reference numerals and a detailed description of such elements may be omitted.

Figure 6A:
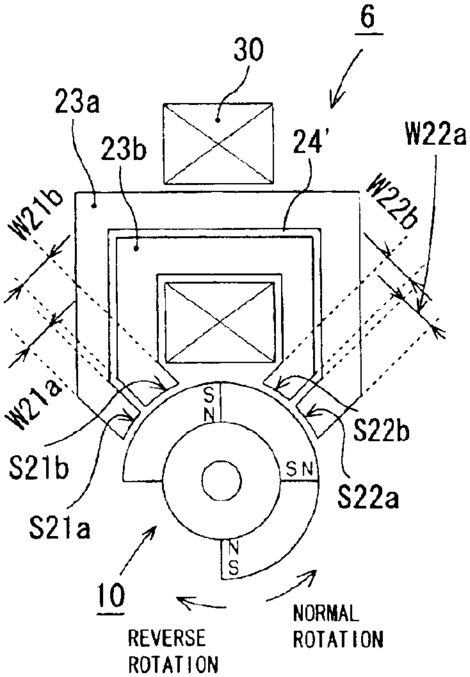
FIG. 6(A) is a schematic view illustrating a torque motor according to a sixth embodiment of the present teachings.
Figure 6B:
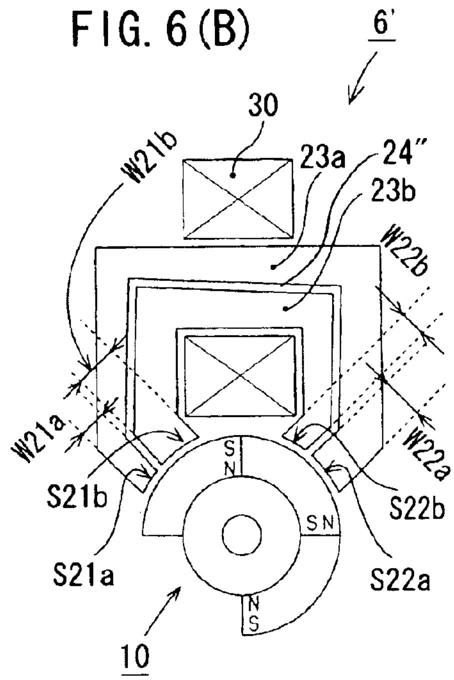
FIG. 6(B) is a schematic view illustrating a modification of the torque motor of FIG. 6(A)

As shown in FIG. 6(A), in a torque motor 6 of this embodiment, the core 23 is formed with a slot 24' having a desired width. The slot 24' extends along the entire length of the core 23 such that the core 23 can be divided to a first core portion 23*a* and a second core portion 23*b*. The first core portion 23*a* has a pair of magnetic pole elements S21*a* and S22*a* that respectively have widths W21*a* and W22*a*. The second core portion 23*b* has a pair of magnetic pole elements S21*b* and S22*b* that respectively have widths W21*b* and W22*b*. However, unlike the fifth embodiment, the core 23 may preferably be unequally divided such that the magnetic pole element S21*a* (or S21*b*) may have an area different from that of the magnetic pole element S22*a* (or S22*b*).

As will be recognized, in this embodiment, the position of the slot 24' is displaced leftwardly of the slot 24 in the fifth embodiment. As a result, the width W21*a* is smaller than the width W22*a* (W21*a*<W22*a*) so that the magnetic pole element S21*a* may preferably have an area smaller than that of the magnetic pole element S22*a*. To the contrary, the width W21*b* is greater than the width W22*b* (W21*b*>W22*b*) so that the magnetic pole element S21*b* may preferably have an area greater than that of the magnetic pole element S22*b*.

Figure 6C:
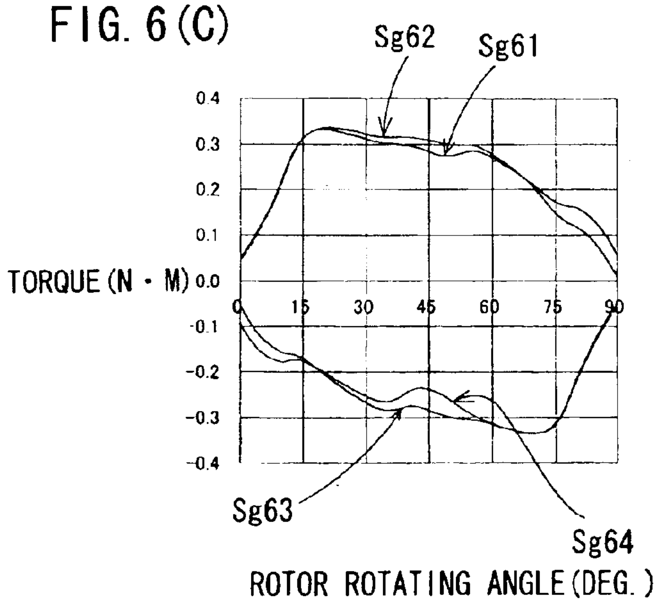
FIG. 6(C) is a graph illustrating torque versus rotor rotating angle relationship in the torque motor for normal and reverse rotation.

As shown in FIG. 6(C), according to this embodiment, a graph of Sg62 and a graph of Sg64 are obtained. The graphs Sg62 and Sg64 respectively correspond to torque-rotor rotating angle curves in the normal and reverse rotational directions. Further, a graph of Sg61 and a graph of Sg63 respectively correspond to the torque-rotor rotating angle curves in the normal and reverse rotational directions, which are obtained by a torque motor (control) in which the magnetic pole elements S21*a*, S22*a*, S21*b* and S22*b* all have the same area as each other.

As will be apparent from FIG. 6(C), the graph of Sg61 is symmetrical (point symmetrical) with the graph of Sg63. That is, the torque motor (control) may generate the same torque in the normal and reverse rotational directions. To the contrary, the present torque motor 6 may generate increased torque in the normal rotational direction as well as reduced torque in the reverse rotational direction.

Thus, torque generating characteristics of the torque motor 6 in the normal and reverse rotational directions may preferably be changed by varying the ratio of the areas of the magnetic pole elements S21*a*, S22*a*, S21*b* and S22*b* (i.e., by changing the position of the slot 24).

Further, according to the torque motor 6 thus constructed, it is possible to increase the torque in the normal rotational direction by changing the position of the slot 24' in the core 23. In other words, the torque in the normal rotational direction can be increased without increasing the coil 30 and the core 23 in size. This feature may lead to downsizing and weight saving of the torque motor 6.

The torque motor 6 in this embodiment can be modified, if necessary. For example, as shown in FIG. 6(B), in a modified torque motor 6' of this embodiment, the core 23 is formed with a slot 24". In this modified form, the slot 24" may preferably be inclined such that a cross-sectional area (in a direction perpendicular to a magnetic flux) of the core 23*a* (or 23*b*) gradually changes from the magnetic pole element S21*a* (S21*b*) toward the magnetic pole element S22*a* (or S22*b*). That is, the slot 24" may preferably be inclined such that the width W21*a* gradually increases from the magnetic pole element S21*a* toward the magnetic pole element S22*a* (or such that the width W21*b* gradually reduces from the magnetic pole element S21*b* toward the magnetic pole element S22*b*).

The torque motor 6' thus constructed may have substantially the same effects as the torque motor 6.

Seventh Detailed Representative Embodiment

The seventh detailed representative embodiment will now be described with reference to FIGS. 7(A) and 7(B).

Because the seventh embodiment relates to the fifth embodiment, only the constructions and elements that are different from the fifth embodiment will be explained in detail. Elements that are the same as in the fifth embodiment will be identified by the same reference numerals and a detailed description of such elements may be omitted.

Figure 7A:
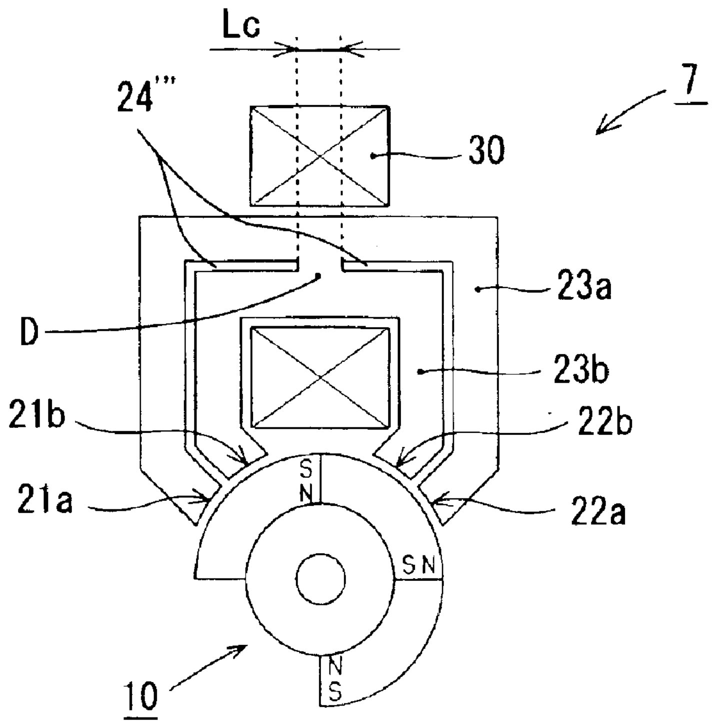
FIG. 7(A) is a schematic view illustrating a torque motor according to a seventh embodiment of the present teachings.
Figure 7B:
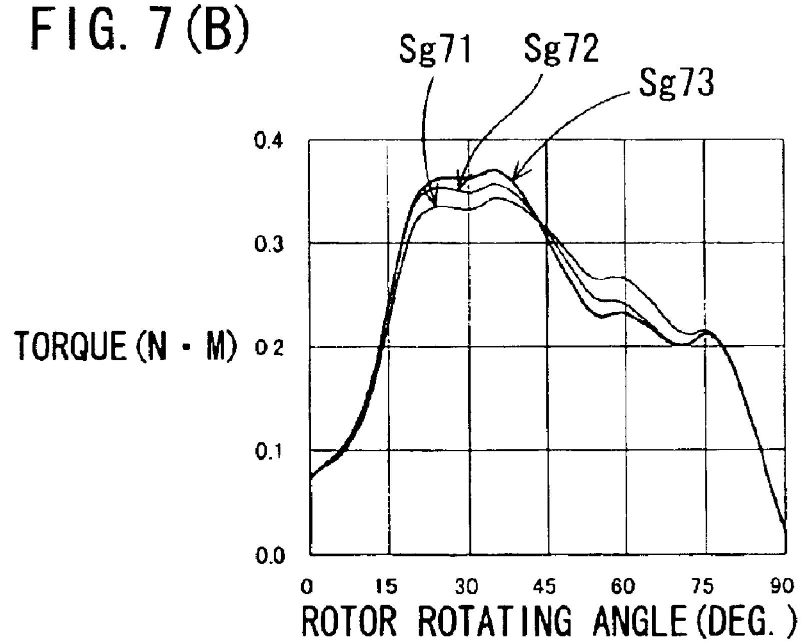
FIG. 7(B) is a graph illustrating torque versus rotor rotating angle relationship in the torque motor.
Figure 8:
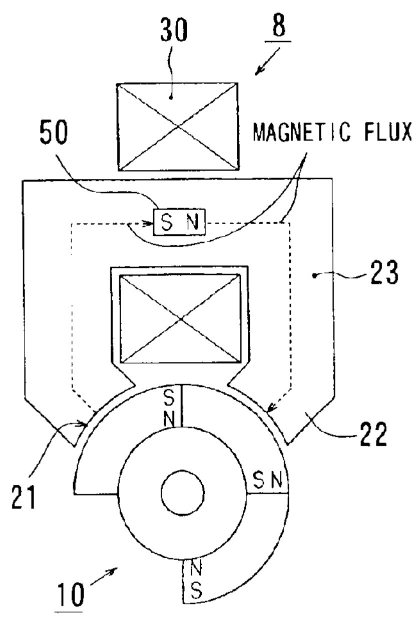
FIG. 8(A) is a schematic view illustrating a torque motor according to an eighth embodiment of the present teachings.
FIG. 8(B) is a schematic view illustrating a modification of the torque motor of FIG. 8(A)
FIG. 8(C) is a graph illustrating torque versus rotor rotating angle relationship in the torque motor.
Figure 8:
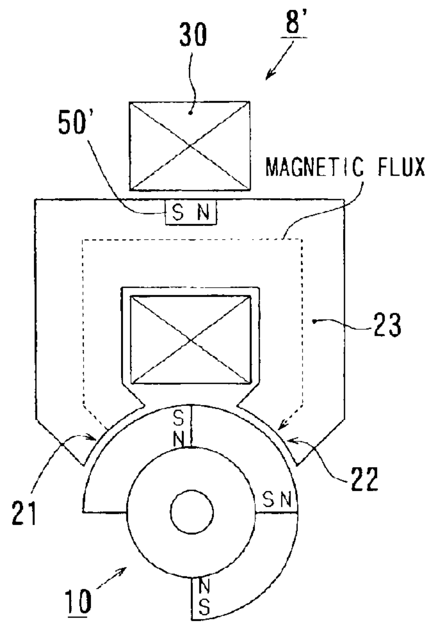
Figure 8:
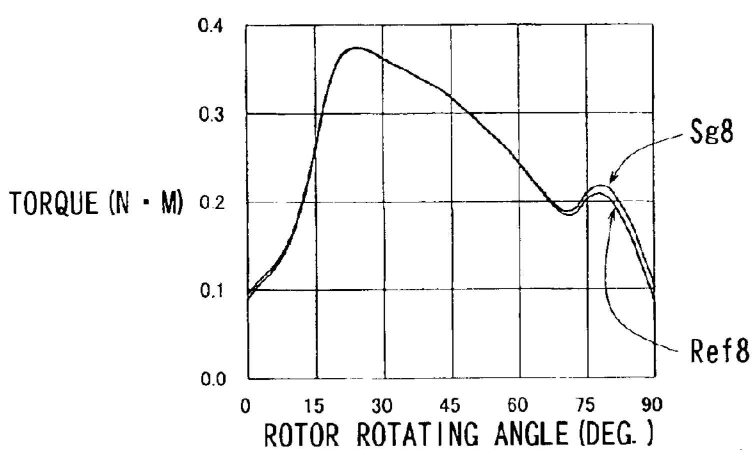
Figure 9:
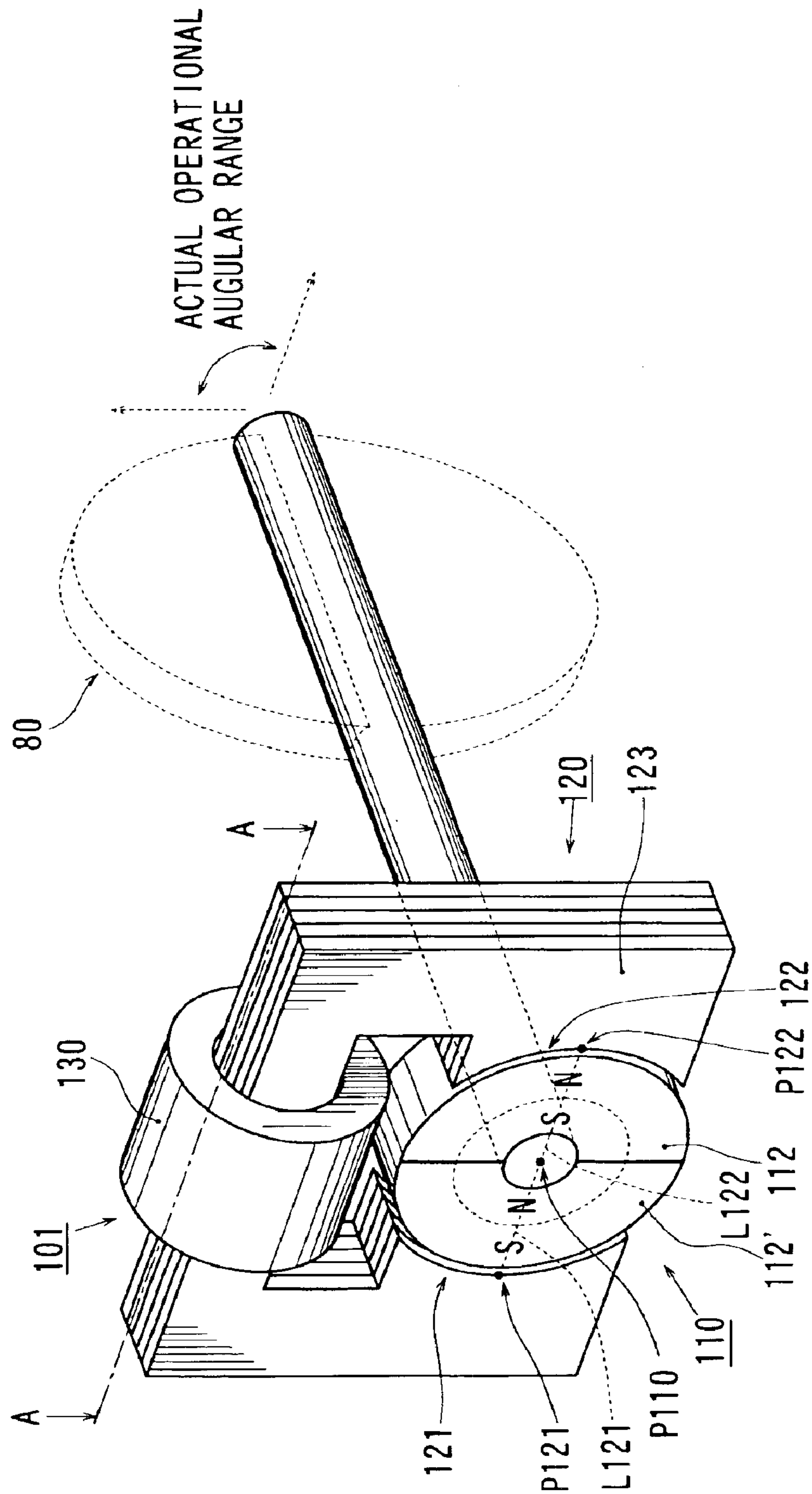
FIG. 9 is a schematic perspective view illustrating a conventional torque motor.
Figure 10:
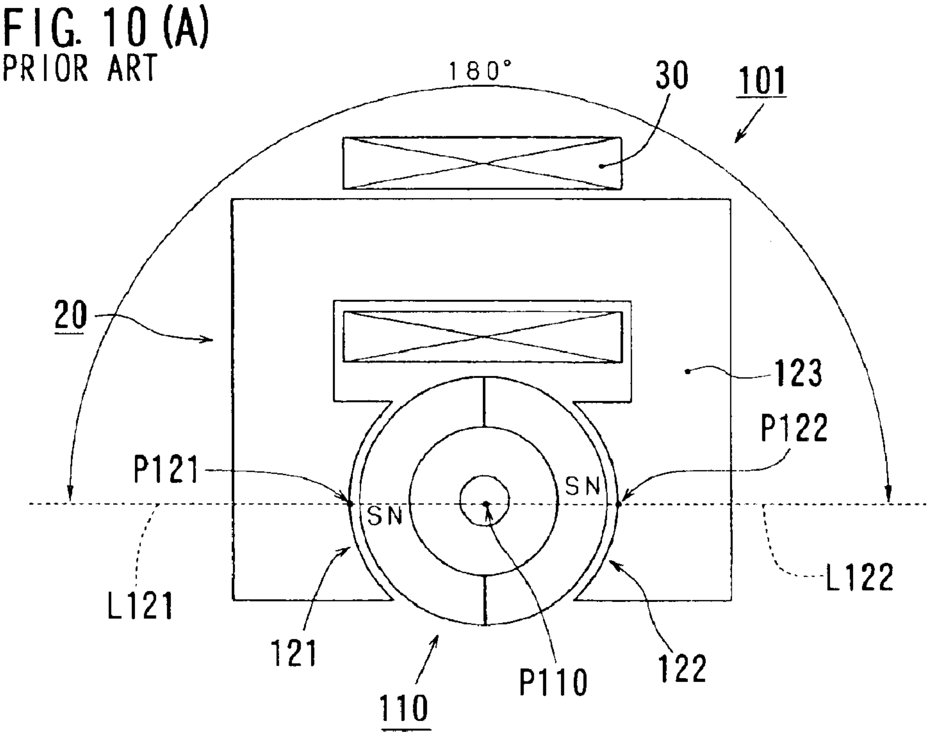
FIG. 10(A) is a schematic sectional view taken along line A—A shown in FIG. 9.
FIG. 10(B) is a graph illustrating torque versus rotor rotating angle relationship in the torque motor.
Figure 10:
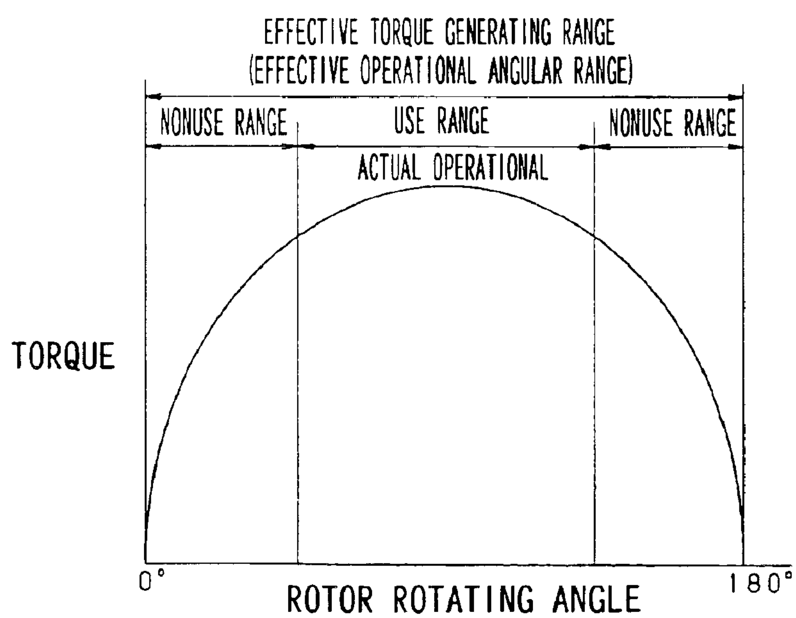

As shown in FIG. 7(A), in a torque motor 7 of this embodiment, the core 23 is formed with a slot 24''' having a desired width. Similar to the slot 24 of the fifth embodiment, the slot 24''' extends along almost the entire length of the core 23. However, unlike the slot 24 of the fifth embodiment, the slot 24''' has a discontinuous portion D, having a length Lc, so that the core 23 is incompletely divided. The discontinuous portion D is positioned substantially at the center of the slot 24'''.

The torque motor 7 of this embodiment may have different torque generating characteristics when the length Lc of the discontinuous portion D is changed. As shown in FIG. 7(B), various types of graphs (i.e., torque-rotor rotating angle curves) Sg71, Sg72 and Sg73 are obtained when the length Lc is changed. The graphs of Sg71, Sg72 and Sg73 respectively correspond to the lengths Lc of 0 mm, 3 mm and 6 mm.

As will be recognized, when the length Lc of the discontinuous portion D is increased, the torque motor 7 may generate increased torque. Thus, the torque generating characteristics of the torque motor 7 may preferably be changed and controlled by simply varying the length Lc without modifying the coil 30. This feature may lead to downsizing and weight saving of the torque motor 7.

Eighth Detailed Representative Embodiment

The eighth detailed representative embodiment will now be described with reference to FIGS. 8(A) to 8(C).

Because the eighth embodiment relates to the first embodiment, only the constructions and elements that are different from the first embodiment will be explained in detail. Elements that are the same as in the first embodiment will be identified by the same reference numerals and a detailed description of such elements may be omitted.

As shown in FIG. 8(A), in a torque motor 8 of this embodiment, a supplemental magnet 50 is disposed in the non-magnetic pole element of the core 23. The supplemental magnet 50 is positioned substantially at the center of the core 23. The supplemental magnet 50 may preferably be embedded within the core 23 such that a magnetic flux thereof may substantially have the same direction as a magnetic flux that is generated by the coil 30. As a result, it is expected that the supplemental magnet 50 thus arranged may increase the magnetic flux caused by the coil 30 over the entire operating angular range (i.e., about 90 degrees), thereby increasing the torque over the entire operating angular range. Further, it should be noted that in a torque motor having an operating angular range greater than 180 degrees, it is not possible to dispose a magnet so as to increase a torque over the entire operating angular range (i.e., greater than 180 degrees).

As shown in FIG. 8(C), according to the torque motor 8 of this embodiment, a graph (i.e., a torque-rotor rotating angle curve) of Sg8 is obtained. As will be apparent from comparing the graph of Sg8 with a graph of Ref8, corresponding to a torque motor having no magnet, at a higher rotor rotating angle range of the rotor 10 (i.e., about 70 to 90 degrees), the present torque motor 8 may have a torque greater than the torque of a torque motor having no magnet.

Thus, according to this embodiment, the torque generating characteristics of the torque motor 8 may preferably be changed without changing the coil 30 and the core 23. That is, the torque motor 8 can generate higher torque by appropriately selecting the magnet 50.

This feature may contribute to the downsizing and weight saving of the torque motor 8.

The torque motor 8 in this embodiment can be modified, if necessary. For example, as shown in FIG. 8(B), in a modified torque motor 8' of this embodiment, a supplemental magnet 50' is disposed in the core 23. However, the supplemental magnet 50' is displaced outwardly of the supplemental magnet 50.

The torque motor 8' thus constructed may have substantially the same effects as the torque motor 8.

Naturally, various changes and modifications may be made to the present teachings without departing from the scope of the invention. For example, the torque motors of these embodiments may have various shapes and construction. Further, the coils and the cores can be made from various types of materials. In addition, the use of the present torque motors is not limited to the throttle valve. That is, the present torque motors can be applied to various control systems that should be controlled only through an angular range of less than 180 degrees.

Representative examples of the present teachings have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A torque motor comprising:

a rotor having at least two magnets disposed thereon, the magnets being arranged and constructed so that the outer surfaces thereof alternately have a N pole and a S pole, the magnets having a total magnet angle of less than 360 degrees, and a stator having a core and at least one coil, the core having a first and second magnetic pole elements facing the rotor and a connecting element interconnecting the first and second magnetic pole elements, the at least one coil being disposed on the connecting element of the core, wherein the magnetic pole elements are arranged and constructed such that an angle defined between a first straight line passing through a center of the first magnetic element and a center of rotation of the rotor and a second straight line passing through a center of the second magnetic element and the center of rotation of the rotor is less than 180 degrees so that the rotor has an effective operating angular range less than 180 degrees.

2. A torque motor as defined in claim 1, wherein the at least one coil comprises a pair of coils that are respectively disposed adjacent to the first and second magnetic pole elements.

3. A torque motor as defined in claim 1, wherein the at least two magnets comprises first, second and third magnets disposed in this order, and wherein the first and third magnet respectively have a first magnet angle and the second magnet has a second magnet angle that is different from the first magnet angle.

4. A torque motor as defined in claim 1, wherein the at least two magnets comprises first, second and third magnets disposed in this order, and wherein the first to third magnet respectively have a third magnet angle, a fourth magnet angle and a fifth magnet angle that are different from each other.

5. A torque motor as defined in claim 1, wherein the core is formed with a slot so as to be divided to first and second core portions that respectively have a pair of magnetic pole elements.

6. A torque motor as defined in claim 5, wherein the magnetic pole elements of each of the first and second core portions respectively have areas different from each other.

7. A torque motor as defined in claim 5, wherein the slot has a discontinuous portion having a desired length so that the core is incompletely divided.

8. A torque motor as defined in claim 1 further comprising a supplemental magnet, wherein the supplemental magnet is positioned such that a magnetic flux thereof has the same direction as a magnetic flux caused by the coil.

* * * * *